(No Model.) 2 Sheets—Sheet 1.

W. TAYNTON & W. J. DERICKSON.
Side Hill Header Wagon.

No. 237,927. Patented Feb. 15, 1881.

Witnesses
Geo. H. Strong.
Frank A. Brooks

Inventors
William Taynton
William J. Derickson
By Dewey & Co.
Attys.

(No Model.) 2 Sheets—Sheet 2.

W. TAYNTON & W. J. DERICKSON.
Side Hill Header Wagon.

No. 237,927. Patented Feb. 15, 1881.

Witnesses
Geo. H. Strong.
Frank A. Brooks

Inventors
William Taynton
William J. Derickson
By Dewey & Co.
Atty

UNITED STATES PATENT OFFICE.

WILLIAM TAYNTON AND WILLIAM J. DERICKSON, OF CLAYTON, CAL.

SIDE-HILL HEADER-WAGON.

SPECIFICATION forming part of Letters Patent No. 237,927, dated February 15, 1881.

Application filed August 23, 1880. (No model.)

*To all whom it may concern:*

Be it known that we, WILLIAM TAYNTON and WILLIAM J. DERICKSON, of Clayton, county of Contra Costa, and State of California, have invented a Side-Hill Header-Wagon; and we hereby declare the following to be a full, clear, and exact description thereof.

Our invention relates to a means for laterally leveling the beds of wagons as they are traveling upon inclined surfaces, and it is more especially applicable to farm, hay, and harvesting wagons, as well as that class of wagons which receive the cut grain from the spout of a header, and which are known as "header-wagons."

Our invention consists in certain connections and attachments, by which they are adapted for use on side hills, and are so arranged, by means of peculiarly-constructed gearing under the bed of the wagon, and operating on curved bolsters, that the bed of the wagon may always be kept on a level without reference to the angle which the wheels may take on side hills, the center of gravity being always kept in such a position as to prevent danger of overturning, even with top-heavy loads.

My improved header-wagon will be of use in those portions of the country where hills abound, as in California, and will make harvesting upon them much easier.

In the header-wagons in ordinary use the bed spreads immediately over the wheels and running-gear, and the load is therefore at a considerable height from the ground. On level roads or fields this is no objection; but in working on hill-sides and uneven ground there is a great tendency in the loaded header-wagons to upset.

In my improved header-wagon the bed is so connected to the running-gear as to be adjustable with reference to it, so that the center of gravity may be altered at will to suit the undulation of the surface of the ground, and the bed of the wagon remains nearly or quite level whatever may be the inclination of the running-gear.

Figure 1:
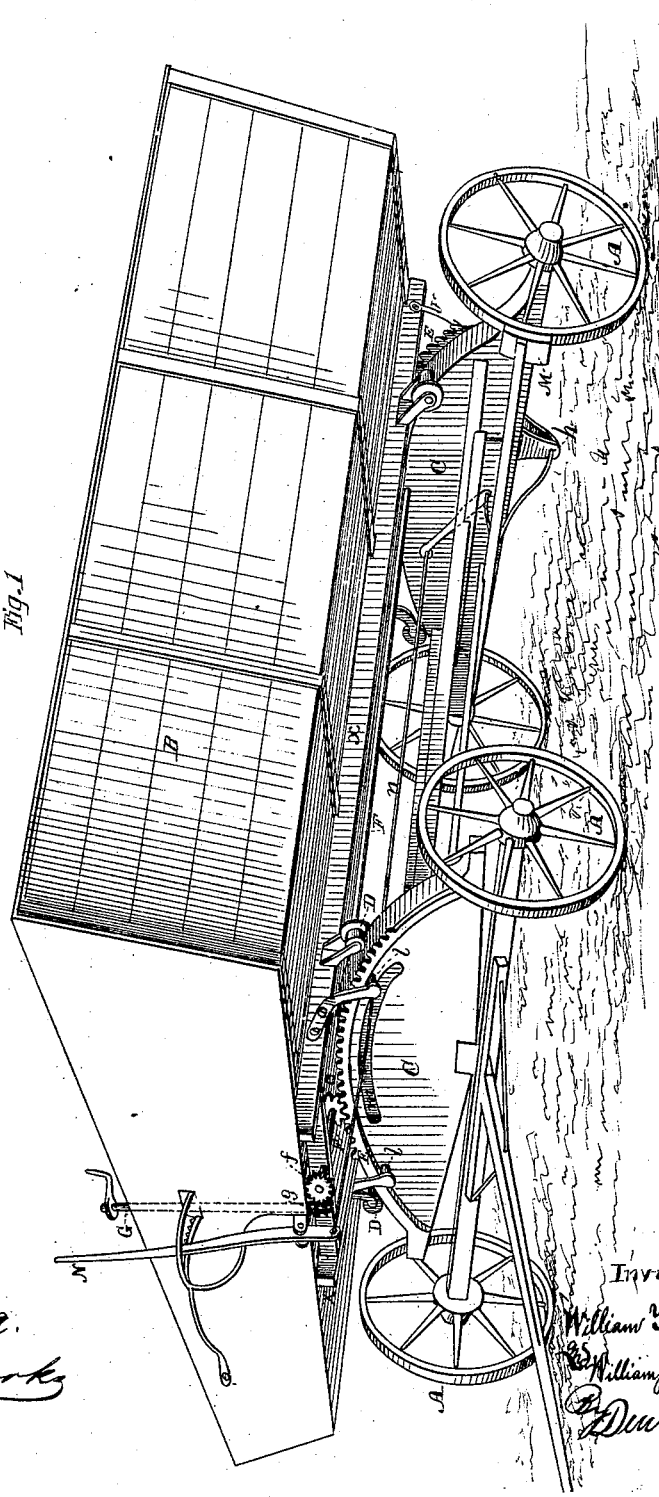
Figure 2:
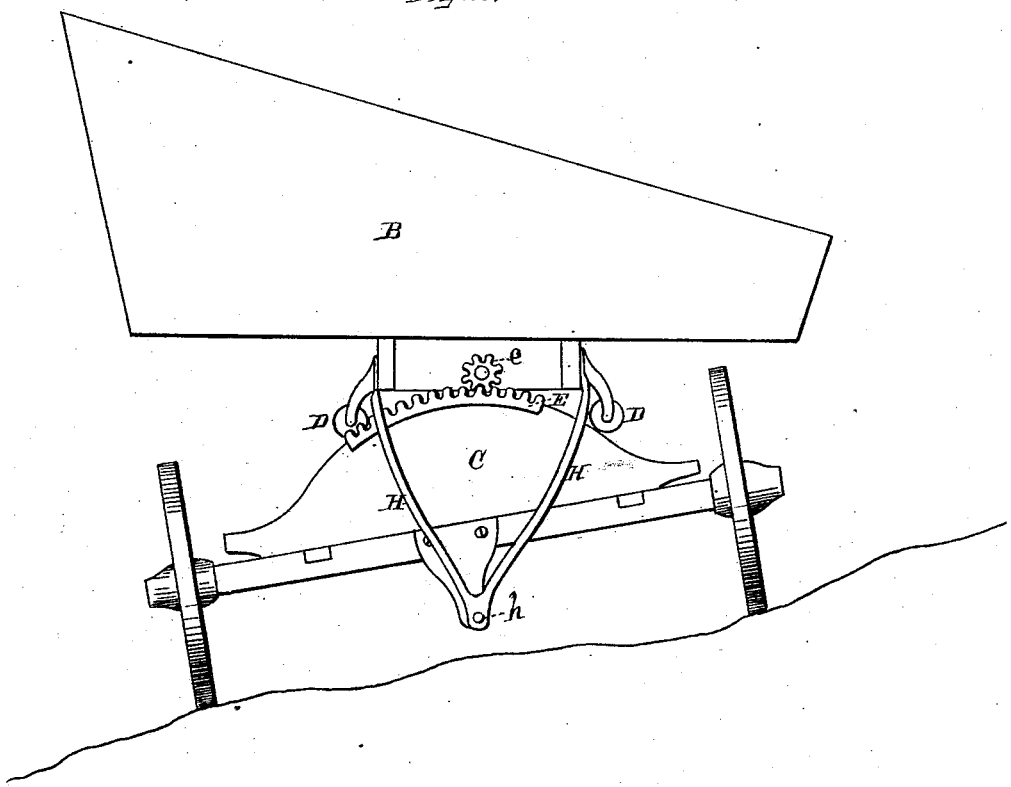

Referring to the accompanying drawings, Figure 1 is a view of my wagon. Fig. 2 is an end view of the same.

Let A represent the running-gear of the header-wagon, and B the bed or portion of the wagon which carries the load. This bed is made in the usual form of header-wagons, with one side lower than the other, in order to facilitate the loading from the spout of the header.

On the top of each axle, and firmly fastened thereto, are the bolsters C, curved or rounded, as shown. X is the frame of the bed, to which the oppositely-placed rollers are attached, as at $d$, just over the bolsters on which they move. The bolsters have their edges broad enough to support the rollers D, which have projecting flanges to keep them in place. There is one of these rollers on each side of the frame X, at each end, so as to make a broad firm support for the bed.

On the outer edges of the bolster, and corresponding in curve, are the rack-bars E, engaging the pinions $e$ on the shaft F. This shaft F extends longitudinally under the bed, and has on its forward end a pinion, $f$, engaging the worm-screw $g$, which is attached to the lower end of the upright rod G. This rod extends up through the bed, and is provided at its upper end with a crank, or equivalent device, within reach of the driver, by which the screw $g$ is made to drive the pinion and rotate the shaft F. When this is done the pinion $e$ upon the shaft, engaging the stationary rack, will be forced to travel to one side or the other, and will thus carry the wagon-bed with them.

Braces H extend from the rear end of the bed down to a common pivot, $h$, below the rear axle, the pivot being the center of the circle in the arc of which the bed is designed to move.

Under the forward rack-bar, E, which is made longer than the rear rack-bar for this purpose, are the rollers $l$, connected by hangers with the frame of the bed, as shown at $t$, whereby the forward end of the bed is held to the bolster.

We can, if preferable, dispense with the rollers $l$ and their hangers, connected with the forward bolster, and use a pair of pivoted braces, the same as on the rear axle, by putting the pivot only so low down as will not interfere with the running-gear or tongue, or either device may be used at both ends, their object being to hold the bed to the running-gear, while allowing it to move laterally.

When the header-wagon is driven on the side of a hill the driver operates the crank and its vertical rod G in either desired direction. This rotates the longitudinal shaft F, the pinion of which, engaging with the curved rack-bars, throws the bed over to one side of the center of the running-gear, throwing the center of gravity of the load nearer the upper than the lower wheels. This keeps the bed of the wagon on a level, notwithstanding the fact that its wheels on one side are higher than those on the other, owing to the nature of the ground. The angle of the bed with relation to the running-gear is altered more or less, according to the character of the hill-side; but this adjustability is controlled by the driver by means of the vertical rod G.

The brakes M are connected to the running-gear in the usual way, but as the operating-lever N is on the movable bed its rod $n$ must be allowed a certain freedom of motion. To adjust it we make a slot, $m$, part way across the forward bolster and under the rack-bar, so that the rod $n$ may, though connected with the lever N, always be able to move laterally as well as longitudinally. The brake will always then be ready to operate without reference to the motion of the bed with relation to the running-gear.

This header-wagon can be used on level ground, as well as on side hills. It will be seen that the arched bolsters are united by longitudinal bars, and their lower edges may be fitted to the axles and bolsters of ordinary header-wagons or other vehicles without any material change.

Having thus described our invention, what we claim as new, and desire to secure by Letters Patent, is—

1. A means for leveling the beds of wagons laterally independent of the angle of the running-gear, consisting of the arched bolsters C, in combination with the wagon-bed supported upon rollers D, which travel upon the arched bolsters, the racks E, shaft F, and pinions $e$, which mesh with said racks, and a means for rotating them, substantially as herein described.

2. The wagon-body B, having the rollers D traveling upon the arched bolsters C, and the longitudinal shaft F, with its pinions $e$, meshing with the curved racks E, and the pinion $f$, in combination with the vertical shaft G, with its worm or screw $g$, or an equivalent device, whereby the angle of the bed with relation to the running-gear may be altered, substantially as herein described.

3. The extended flanges of the rack-bar E, having rollers $l$ moving beneath them, and connected by hangers to the frame or bed at $t$, so that the rollers D are held in contact with the bolsters as the bed is moved from side to side, substantially as herein described.

4. The wagon-body B, moving laterally upon the arched bolsters, as shown, and having the brake-lever N attached to it, while the brake-beams are attached to the running-gear, in combination with the bolster C, having a curved slot, $m$, whereby the brake-rod $n$ is allowed to follow the movement of the body, substantially as herein described.

In witness whereof we have hereunto set our hands.

WILLIAM TAYNTON.
WILLIAM J. DERICKSON.

Witnesses:
S. H. NOURSE,
FRANK A. BROOKS.